United States Patent Office 3,646,078
Patented Feb. 29, 1972

---

3,646,078
OXIDATION OF HYDROCARBONS TO PRODUCE CARBOXYLIC ACIDS
Robert J. Fanning, Baton Rouge, La., assignor to Ethyl Corporation, New York, N.Y.
Continuation-in-part of applications Ser. No. 442,577, Mar. 25, 1965, and Ser. No. 501,860, Oct. 22, 1965. This application Dec. 26, 1967, Ser. No. 718,642
Int. Cl. C08h 17/36
U.S. Cl. 260—413       15 Claims

ABSTRACT OF THE DISCLOSURE

This invention discloses that oxidation of hydrocarbon materials to produce carboxylic acids is enhanced in a single phase coordinated liquid system containing a suitable reactive diluent system. Propionic acid is a preferred single component reactive diluent system whereas a more highly preferred reactive diluent system is a mixture of acetic acid and another of 3-5 carbon atoms per molecule particularly propionic acid in about equal mol proportions. In comparison to the oxidation of typical hydrocarbon materials without such a reactive diluent system, considerably lower contamination of oxidate by lactones, heavy esters, hydroxyl groups and carbonyl groups is realized.

CROSS REFERENCES TO RELATED APPLICATIONS

This application is a continuation-in-part of my application Ser. No. 442,577, filed Mar. 25, 1965 entitled Chemical Process, now abandoned, and of my co-pending application Ser. No. 501,860, filed Oct. 22, 1965, entitled Chemical Process, now abandoned.

BACKGROUND OF THE INVENTION

Field of the invention

This invention pertains to the manufacture of carboxylic acids by the oxidation of hydrocarbon material. The preferred acid products include long chain monobasic carboxylic acids, particularly those having from about 10 to 20 carbon atoms per molecule such having utility in the manufacture of soap, similar longer chain acids having up to about 30 carbon atoms per molecule used typically for waxes, and similar shorter chain acids, particularly those having from about 6 to 9 carbon atoms per molecule such having utility in the manufacture of ester lubricants. Preferred acids include polybasic acids of similar numbers of carbon atoms per molecule, particularly dibasic acids with from 6 to 12 carbon atoms per molecule such as adipic acid, pimelic acid, octandioic acid, decandioic acid and dodecandioic acid such having utility in the manufacture of plastics for fabric, tires, etc. These materials are produced preferably from approximately corresponding normal acyclic or cyclic hydrocarbons, saturated or unsaturated. Branched hydrocarbons are usable in the process; however, they are generally less preferred since resulting branched chain contamination in product acids is generally desirably avoided. Typical specific hydrocarbon material feeds are pure or mixed normal hydrocarbons having from about 6 to about 30 carbon atoms per molecule, saturated cyclic hydrocarbons having from about 6 to about 12 carbon atoms per molecule and monoolefinic straight chain hydrocarbons having from about 6 to about 30 carbon atoms per molecule.

Description of the prior art

The production of the carboxylic acids of the foregoing field is a matter of great commercial importance as is evident from the typical utilities set forth and has been investigated repeatedly and at great expense by numerous scientists. One of the more important approaches to the production of synthetic carboxylic acids is the process known as hydrocarbon oxidation. In this prior art process a starting hydrocarbon material, typically pure or mixed normal alkanes of 6–30 carbon atoms per molecule, is subjected to a controlled limited oxidation with a suitable molecular oxygen containing or producing material or "chemical" oxidant such as air, permanganate, nitric acid, or numerous others; the aim being primarily for a process capable of introducing only a single functional carboxylic group in a suitable starting molecule and producing acids characterized by virtual freedom from noncarboxyl oxygen containing functionality such as carbonyl and hydroxyl. Unfortunately, it is characteristic of all known prior art in this area that a really "controlled" insertion of carboxyl groups is virtually impossible to obtain in simple one step operation due to the fact that oxygen attack upon hydrocarbon molecules fundamentally is not selective and occurs virtually statistically at any internal carbon atom of a molecule as well as at terminal carbon atoms. The result is that any molecules originally attacked at internal carbon atoms (internal carbon atoms being those linked to at least two other carbon atoms) must undergo cleavage producing one or two acidic fragments of a chain structure different from the carbon skeleton structure of the starting hydrocarbon material. In addition to this, an oxygen attack upon a hydrocarbon molecule does not necessarily produce a carboxyl group on that molecule initially or even ultimately but rather generally involves one or more of several intermediate oxidation states or products, particularly the hydroperoxide, the secondary alcohol (hydroxyl), and the ketone (keto) or alternatively the primary alcohol (hydroxyl) and aldehyde (-ic) if the initial oxygen attack occurs at a terminal carbon atom.

Thus, the effluent from a hydrocarbon oxidation reaction generally contains a horrendous mixture of molecules of numerous degraded chain lengths even where starting from a single or "pure" long straight chain saturated feed hydrocarbon, together with various partially oxygenated species such as hydroperoxides, alcohols, and carbonyl materials. In addition to this, the mixture is further complicated by various difunctional molecules resulting from plural attacks upon individual molecules, one of such attacks on the molecules in question frequently involving only a partial conversion to one of the internal carbon atoms intermediates previously mentioned. Not only are all of the foregoing individual original or fragmentary molecules present, but in further complication numerous of the species involved undergo combination reactions whereby certain fragments add together to produce new long chain molecules or rearrange their own skeletal configurations. Typcial of these additional types of transformations are simple esterification wherein one acid and one secondary alcohol molecule combine to form a long ester molecule of up to double the number of carbon atoms present in the starting hydrocarbon and lactonization wherein an internal ester is formed from separate carboxyl and hydroxyl groups on the same molecule. In addition to this, it is, of course, evident that polymeric esterification combinations can result with the various difunctional molecules present, providing molecules of up to three, four, or more, times as many carbon atoms as in the starting hydrocarbon. The foregoing materials characteristic of oxidate may be defined individually or collectively or in any combination as hydrocarbon material species containing oxygen functionality regardless of any specific prior history requirements.

The foregoing complexity of the oxidate systems introduce vast problems in the effective commercial utilization of any such process where any significant purity requirement exists because complex separation and purification operations are generally required. Provision must also be made for either recovering the raw material value of the undesired products or alternatively with regard thereto developing attractive markets for vast numbers of different materials. The separations of the various materials is a tremendously complicated proposition as evidenced by the existence of literally hundreds of issued patents dealing with various aspects and processes for purification.

Additional hundreds of issued patents deal with various aspects of the oxidation of hydrocarbons to produce various materials, even alcohols, ranging from details with regard to catalysts, oxidants, saponification separation of intermediates for recycle and the like. Some issued patents deal with the use of various diluent or solvent media in the oxidation per se. Typical of such diluent-involved processes is U.S. Pat. 3,054,814 which deals with the production of unsaturated di-keto acids using a complex catalyst system involving halogen and which uses an acidic reaction medium or solvent which is an aliphatic monocarboxylic acid of from 2 to 8 carbon atoms per molecule, preferably acetic acid. This particular prior art process is typical of numerous others which equate all the lower acids as reaction medium or solvent and which almost universally show a preference for acetic acid, but an important fundamental point to note is that it seeks to produce acids with 200 percent carbonyl content and 100 percent unsaturate content which is a far cry from the field of the present invention which is directed to products with substantially zero percentage of each.

It is noteworthy that, although the foregoing cited patent uses diluent or solvent langauge, actually the quantity of such material used (5 percent) and the nature of it (preferably acetic acid) are such as to preclude an actual solvent situation as shown herein by several examples. One may see in the acid presence of that patent merely an insurance factor with regard to maintaining a catalyst component in non-alkali carboxylate form despite the ever present danger of carry-over of base from the preceding alkali wash applied to the raw material in the overall processing scheme of the patent.

SUMMARY

The principal feature of the persent invention is the unique concept of performing the oxidation of hydrocarbons in a single phase coordinated liquid system employing a reactive diluent system. Such a reactive diluent system is distinguished from the known prior art on a basis of involving a compatible reactive short chain material or an equivalent which apparently reacts with one or more of the intermediate oxidation products, particularly believed to be the alcohol or a precursor thereof; to prevent the reaction of such with long chain material. In addition the reactive diluent system concept provides an oil-water liquid phase coordination capability to maintain the various reactants, intermediates and products including the polymeric ones in a single phase coordinated liquid system as far as all liquid components thereof are concerned. It is important to emphasize that a desired dual nature of a reactive diluent system is a concept which has been unknown heretofore, particularly by all prior art satisfied in the use of acid solvent or diluent media described merely as a lower acid having from about two to eight carbon atoms per molecule, whether or not a preference is given as is generally expressed for acetic acid. The present application presents data to establish that for the present considerations the only single acid diluent which is readily valuable for the plural needs is propionic acid. It is shown that this is, unexpectedly, superior to acetic acid as a single acid diluent suggesting the existence herein not only of a new concept but also a new mechanism. Beyond this, however, it is shown that a dual acid reactive diluent system, particularly a mixture of acetic acid and propionic acid, is vastly superior to the propionic acid system. It appears that what is required in a reactive diluent system is availability of a significant quantity of organic acid highly reactive to esterification, particularly acetic acid or even formic acid to exhibit a monopolization of at least some intermediate functional groups, preferably all hydroxyl groups, to prevent the formation of heavy esters and lactones. It appears that this can be truly effective only in the presence of an additional phase coordination component, preferably a lower organic acid or mixture of acids with from 3 to about 5 carbon atoms per molecule, typically propionic acid or equivalent such as butyric acid or pentanoic acid. One highly surprising aspect of this invention is the fact that a reactive diluent system is advantageous even when dealing with short chain hydrocarbon materials that apparently should not require special phase coordination capability between water phase material and oil phase material to maintain a single phase coordinated liquid system. This beneficial result even in such systems appears to arise through a favorable influence upon or suppression of the formation of heavy mono and poly esters which get into the oil-phase system category even where the starting materials that produced them were miscible with "water phase." Typical of such a situation is the oxidation of cyclohexane to produce adipic acid. In such a system, since acetic acid and cyclohexane are miscible, one might suspect that the $C_3$—$C_5$ component, such as propionic acid would be superfluous; however, it appears that complex esters of high molecular weight (apparently oil phase) such as dicyclohexanol adipate may form in a system that does not employ reactive diluents such as those of the present invention and these may form even transitorily in the present oxidation but that such esters, if formed in a reactive diluent system with single phase coordinated liquid capability, are promptly converted to cyclohexanol acetates and that the further oxidation to acid of the cyclohexanol "component" of such an ester is then benefitted through the use of the present process concept.

The amount of lower acids used in a single phase co-ordinated system is quite large, ranging from about 20 to about 50 percent by volume of the total liquid. Greater or lesser amounts of lower acids are helpful but less desired because of restriction of quantity of available hydrocarbon materials on the one hand, and much less than optimum effect on the other. The ratio of lower acids of three and above to those below three is preferably about an equal molar basis which may be expressed more conveniently on a volume basis for acetic and propionic mixtures as 1.5:1 propionic:acetic. Typically than this results in an overall ratio of 25:15:10 of hydrocarbon material:propionic acid:acetic acid.

The results of performing an oxidation of hydrocarbon materials in accordance with the present process are considered to be quite unexpected on a basis of the known prior art. The magnitude of the improvement is so great as to, surprisingly, make it possible in many instances to use product acids directly where extensive purification of a conventional oxidate was previously considered essential to remove the undesired carbonyl and olefinic contamination. An outstanding measure of the improvement is a reduction in the quantity of lactones present in typical oxidates by a factor of seven to one in comparison to prior art oxidates. Another comparative measure of the improvement resulting from the use of the present process is a similar reduction by a factor of three in the hydroxyl number, carbonyl value and ester value of typical oxidate. The foregoing specific improvement figures are based on the use of the preferred acetic acid-propionic acid reactive diluent system with long chain normal hydrocarbons. The results of using the "propionic only" system show useful improvements of about 2 to 1 in the hydroxyl number and carbonyl value; however, it appears that a truly effective control over lactones and esters requires the co-presence of an acid lower than propionic, such as acetic acid. It is known that the hydroxy acids of the formula are in an equilibrium with the internal ester or lactone form which strongly favors the lactone. The present results suggest that an equilibrium is stronger in favor of "acetate esters" but not so with "propionate esters." Other hydroxy acids, such as which are less prone to the internal esterification, can be monopolized as propionates providing the 2:1 improvement in hydroxyl number in a propionic-only system.

One important aspect of the present oxidation is that it is desirably conducted in a mode which is not limited primarily by lack of oxygen. In other words once an attack occurs at a carbon atom of any given molecule it is desired to have adequate oxygen available to enhance completion of the oxygenation to acid of any and all molecular "ends" produced by a resulting cleavage. Since oxygenation to $CO_2$ or even violent combustion or explosion would occur with unlimited oxygen availability unless some other inherent control were provided, it has been found that a temperature limited mode of operation is highly effective to enhance the production of acid. Thus the significance of temperature becomes apparent and since new attacks on molecules appear to increase disproportionately relative to completion of oxidation to acid with operation at higher temperatures, it is desired to maintain the temperature of the reacting material as low as possible at all times when oxygen is available, still maintaining the oxidation which exhibits characteristics of a chain reaction having a definite threshold which is different for different types of materials. Therefore, where it is possible to sustain reasonable oxidation rates for typical saturated straight chain materials at 115° C., cyclic materials at 106° C., and olefinic straight chain materials at 95° C., it is desired to maintain the operation temperatures near such threshold of oxidation extinction marginal points. In batch operations this generally involves the use of a heel from a previous run to initiate the chain reaction sequence or alternatively, a brief high temperature "induction period" if "all fresh" material is used. A typical induction period temperature is 140° C.

The foregoing considerations explain why most of the examples involved a standardized comparison procedure in which off-gases were not allowed to become exhausted of oxygen below 14 percent. Obviously less oxygen is workable however such ready availability of oxygen contributes materially to enhanced selectively to the carboxyl configuration as contrasted to the hydroxyl or carbonyl configurations.

This leads into the subject of using oxygen in more concentrated form, such as pure oxygen instead of air or using oxygen enriched air. Despite cost factors such does provide benefits however an ever present consideration is that of explosion danger.

Dilution of oxygen with materials other than nitrogen is a worthwhile consideration. For example, $CO_2$ has particular attraction because it is not a "foreign" material, as is nitrogen, since it is a by-product of the oxidaion. Actually at the higher pressures involved, such as 250 p.s.i.g., there appears to be decarboxylation retardant effect, such as an equilibrium, when $CO_2$ contributes to the "inert" or non-oxygen content of the oxidizer system. This is sometimes obscured in a continuous system where the off-gases are recirculated; however, it is brought about in a batch operation by deliberately adding $CO_2$ to the reaction environment at the start.

One important aspect of the present invention is the discovery that a reactive diluent system can avoid the build-up of adverse esters, particularly the lactone type which can be difficult to remove, despite the fact that there is a huge conglomeration of prior art that teaches that in adding an acid to an oxidizer system one deliberately enhances the production of alcohol by trapping them as esters in the oxidizer through the use of any lower organic acid (general) or inorganic acids such as boric or phosphoric or even mixtures of such inorganic and lower organic acids (general).

It appears that 100 percent coordination or coordination effectiveness is desirable at all times during an oxidation from a selectivity of oxidation standpoint in controlling oxidation to that of intermediates and reducing plural attacks upon molecules. On the other hand, there is obtained a significant reduction in the quantity of intermediates and of difunctional molecules wherein one function is an intermediate function rather than both being carboxylic when only partial or incomplete coordination exists for a part of an oxidation. The significance of this lies in the fact that water is produced in the course of oxidation eventually altering any initial coordination which even may result in phase separations in some instances. Thus provision for removal of water from the system is desirable in some instances.

In a related vein, under a theory that the effective oxidant, whatever it may be, is concentrated in the "aqueous phase," there appears to be advantage in beginning an oxidation with a small amount of water present, rather than seeking an absolutely anhydrous system. Such desirably retains a phase coordinated system with leeway for accepting some additional oxidatively produced water without incurring serious phase separation. The result of this appears to be a reduction in the so-called "induction period" before a high oxidation rate is attainable at the low temperatures.

The make-up of the lower acids reactive-diluent systems is quite limited as earlier set forth. As a practical matter the propionic-acetic system is preferred. An acetic-butyric acid system is suitable particularly with feeds of high molecular weight such as the normal hydrocarbons of 20–30 carbon atoms per molecule. In general, one must become increasingly aware of the lesser oxidation resistance of acids above propionic and a reduced coordination effectiveness on a weight basis.

The present process also achieves an excellent production of dibasic acids in a single air oxidizing stage. Considerable simplification is realized in comparison with prior art commercial practice for producing dibasic acids such as adipic which generally involve at least two oxidation stages with difficult intervening separations and complex ancillary purifications and require a chemical agent oxidant such as nitric acid in the last stage. It is particularly appropriate to emphasize that many prior art oxidation processes deliberately form esters, such as borates, to facilitate the removal from the first stage of intermediate cyclohexanol which is then recovered from the esters and sent to the second stage. In the present single phase liquid coordinated system as shown by the analyses, esters are destroyed or the equilibria of formation thereof drastically altered. In essence then, the esters are destroyed or prevented from forming rather than being deliberately formed as a means for removal of intermediate alcohols for later, different processing. This is shown clearly by the lowered hydroxyl and ester values obtained with the present process in comparison to the prior art.

Operation under pressure is particularly desirable in the present process because of the low boiling points of the materials involved and because pressure appears to deter decarboxylation of acids prone to such, particularly dibasic acids. The oxidation is not particularly sensitive to pressure as long as the pressure is adequate or coordinated with condensation from the off-gases and recycle to insure retention of the acetic acid or of the materials treated or produced. Pressures from about 5 to 25 atmospheres are preferred.

By prior standards, post-treatment of oxidate from this process and recovery of acids therefrom is a surprisingly simple matter, far easier than with prior art oxidates because of the extremely low content of the highly troublesome hydroxyls, carbonyls, esters and lactones. The boiling points, melting points and solubilities of the particular materials involved generally require some variation in individual processing. As an example where hexadecane is oxidized to produce $C_{10}$–$C_{16}$ monobasic acids, the lower acids are removed from the oxidate by a simple distillation and water wash prior to any saponification and deliberately returned at least in part to the oxidation. The remaining oxidate material is treated with a saponification agent to separate unsaponifiables to be recycled to the oxidation. The acids are sprung by treatment with mineral acid and in many instances can be used without further treatment since 65–90 percent or more of the acid molecules are free of contamination as by hydroxy groups, carbonyl groups on unsaturation. A mild hydrogenation of oxidate before saponification or of saponification derivatives is frequently desirable to improve this depending on the required purity of product.

Several rules-of-thumb have been developed as to quality of oxidation. A ratio of Acid Value to Ester Value in crude acid sprung from soaps without intervening hydrogenation is considered good when it is 10:1 or better. This is easily achieved in the present process but is virtually impossible with prior art oxidation processes when dealing with the preparation of straight chain saturated acids in the 10–20 carbon atoms per molecule range. Another criteria is low carbonyl value. Values of about 1 and below are readily attainable with the present process but not with prior art processes.

One surprising aspect of the present process is that at the low temperature "threshold" type of operation, preferred herein for the preferred hydrocarbon materials, primary alcohols such as dodecanol-1 and tetradecanol-1 and aromatics such as benzene and toluene exhibit not only negative oxidation characteristics as to themselves and hence undesirability as to classification as suitable hydrocarbon materials but they even have suppressive tendencies which adversely affect the oxidation of other materials shown herein to be readily oxidized with benefit using the principles of the invention. Thus, in connection with some of the following examples where alcoholic alkali saponifications (KOH) and hydrocarbon extractions (pentane) are discussed, one may experience mysterious non-reproducible results where recycle of unsaponifiables is employed. Without detailed experience one may see no particular need for thought in performing a pentane extraction, but substitutions of aromatic extractants have been shown to be basis for caution.

The adverse effect of primary alcohols apparently is merely a matter of relative esterification equilibria and stability of resulting primary hydroxyl esters under the conditions of oxidation.

These primary hydroxyl sites will oxidize further at higher temperatures than preferred herein and conceivably could be used; however, at such higher temperatures the present benefit of enhancement of completion of oxidation to acid at the sites of original attack on the internal carbon atoms relative to occurrence of new attacks is not so pronounced.

BRIEF DESCRIPTION OF THE DRAWINGS

In the course of experimentation, vapor phase chromatography was employed for the analysis of samples and was preceded by the conversion of acids into methyl esters by several techniques of esterification. One employed $BF_3$ and methanol. Another esterification used diazo methane. Results were comparable. Paraffins, ketones, olefins, secondary alcohols and the like remain in the sample to exhibit their own characteristics.

Figure 1:
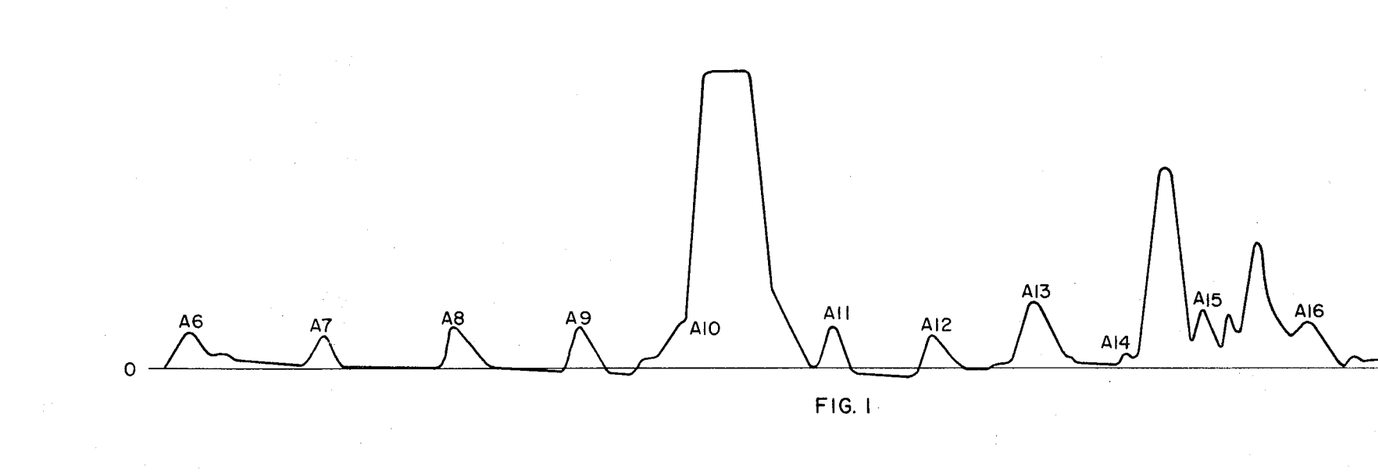
FIG. 1 shows a simplified vapor phase chromatography chart for an oxidate derived from a reactive diluent oxidation in accordance with the teachings of the present invention. This corresponds to Example 1.
Figure 2:
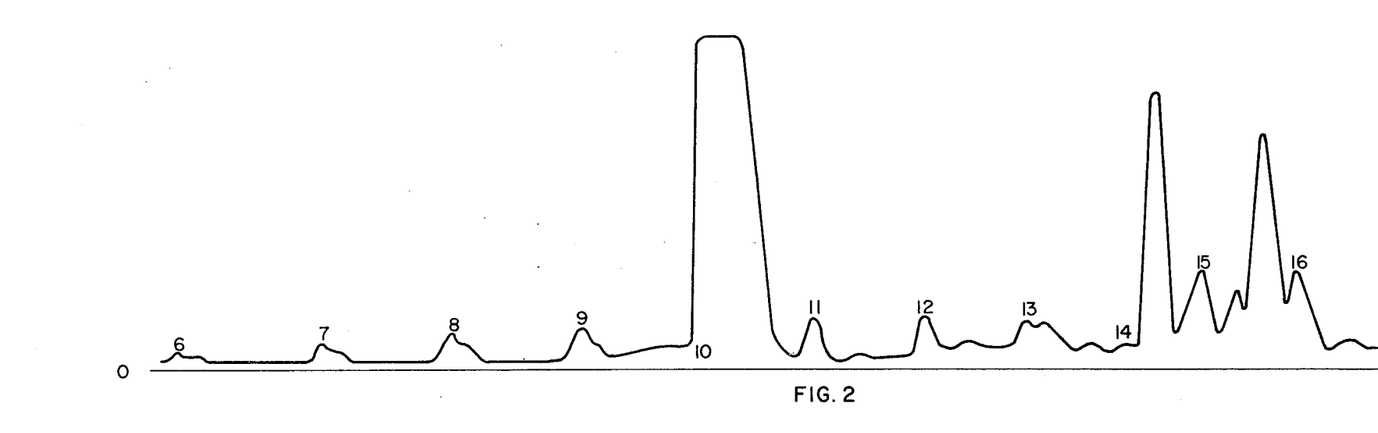
FIG. 2 shows a similar chart for an oxidate from a similar oxidation in the absence of the reactive diluent system. This corresponds to Example 2.

A typical vapor phase chromatography chart derived in analysis of the product of an ordinary oxidation of pure hexadecane is represented in FIG. 2 which is discussed first. This shows "peaks" 6, 7, 8, and 9 which indicate the methyl esters of monocarboxylic acids having 6, 7, 8, and 9 carbon atoms per molecule, respectively. Each of these peaks is followed by a stair-step of significant amplitude and duration. Peak 10 is of large amplitude and corresponds to unreacted hexadecane. The step following peak 9 corresponds to hydrocarbon of 15 carbon atoms per molecule, that following peak 8 corresponds to hydrocarbon of 14 carbon atoms per molecule and so forth. In contrast, a chart showing analysis of a product resulting from an oxidation in a single phase liquid coordinated system using reactive diluent is shown in FIG. 1. In this chart one notes the almost complete absence of the stair-steps following the same methyl esters indicated by reference characters A6, A7, A8, and A9. This suggests a significant reduction in the quantity of valuable cleavage fragments of the original feed hexadecane that are not promptly converted to useful oxygenated molecules.

Turning now to the portion of the analysis representations in the region of the indications for the monocarboxylic acids having 11, 12, 13 and 14 carbon atoms per molecule, it is noted in FIG. 2 that there are considerable quantities of numerous impurities between the peaks identified as the respective acids (in methyl ester form). In comparison, FIG. 1 shows a higher ratio of total $C_{11}$–$C_{14}$ acids (methyl esters) relative to the total intervening impurities than does FIG. 2.

GENERAL DISCUSSION OF EXPERIMENTAL RESULTS

A reduction in the hydroxyl content of the oxidate was one of the early objects of the research leading to the present invention; however, the magnitude of the reduction in relation to the small change in ester value for preferred Example 1 and comparative Example 2 hereinafter discussed in detail was unexpected. The improvements for the more preferred Examples 3 et seq., are even more significant. Although the hydroxyl percentage of Example 1 was only one-half of the value experienced in prior art type oxidation of Example 2, the ester value of Example 1 was higher only by 10 percent. It is recognized that these ratios are not directly comparable quantitatively because other factors are involved but they are generally indicative of a 5-for-1 alteration. Each additional molecule of ester produced in the oxidate as a result of the presence of the preferred propionic acid withdraws not just one but several hydroxyl groups from those available for other esterification of a more adverse nature, namely the production of esters of $C_{11}$–$C_{15}$ acids or of poly esters.

An incidental benefit of reactive diluent oxidation is that adverse effects of polyfunctional molecules in the oxidate or in the oxidation mixture during the reaction are reduced considerably since the hydroxyl groups can be tied up as comparatively low molecular weight acetates or propionates from the outset of the oxidation making it possible to employ a higher percentage conversion of original hydrocarbon feed to oxygenated molecules without much of the adverse effect of excessive plural attacks on molecules. For example, polyesters based on hydroxy acids are no longer a limiting factor to be held in check so that dibasic acid production and permissible molecular weight reduction due to cleavage provide the principal remaining limitations to high conversion to produce monobasic acids.

A matter of considerable significance is the low temperature at which excellent oxidation rates are experienced, particularly with the more preferred plural acid reactive diluent systems. Typical sustaining temperatures (slightly above the oxidation extinction threshold) are 115° C. for straight chain materials such as hexadecane and octadecane and mixtures of such materials, such as those from $C_{10}$–$C_{20}$; 106° C. for cyclic materials such as cyclohexane; and 95° C. for olefins, typically tetradecane-1. At these temperatures, corrosion and related product purity problems are quite minor and numerous readily available commercial phenolic plastic coatings of low cost are suitable. These coatings enhance high purity of product.

Returning to the charts of FIGS. 1 and 2, attention is directed to the indications of the presence of substantial quantities of materials boiling above the methyl ester of tetradecanoic acid in both traces. Two of these peaks correspond to pentadecanoic acid and hexadecanoic acid. Others are believed to be largely ketones and secondary alcohols. The significant feature in any event is that the quantity of these materials is appreciably lower in reactive diluent oxidation in comparison to non-additive oxidation. The absolute values for these aspects are shown more positively by the chemical analyses reported hereinafter for the various examples than by the VPC showings.

EXAMPLE 1

1500 ml. of hexadecane and 10 percent by weight of propionic acid were fed into a 2-liter stirred pot oxidizer. 15 ml. tertiary butyl hydroperoxide was used as catalyst.

This mixture was oxidized for 4 hours at 150° C. and atmospheric pressure using atmospheric air fed at the bottom of the mass as bubbles through an open ¼″ glass tube. A propeller-type agitator rotated in the mass at 400 r.p.m. During oxidation, propionic acid boiled overhead; this was collected and measured and an equivalent amount of fresh acid was added to the reactor to maintain the desired acid concentration.

At the end of this period the oxidate was sampled, and the acids recovered by saponification and acidification. The unsaponifiables were recovered and used as feed in a subsequent similar oxidation run in which the rate of oxidation was approximately double the oxidation rate for fresh hexadecane.

The oxidate sample collected above had an acid number of 39, an ester value of 29.3, a carbonyl number of 0.65 and a hydroxyl number of 0.45. A VPC analysis was run on the oxidate, using conversion of acids to methyl esters. This analysis forms the basis for FIG. 1.

EXAMPLE 2

Example 1 was repeated for comparative purposes without adding lower acid initially or otherwise. The resulting oxidate had an acid number of 18.9, an ester value of 28.2, a carbonyl number of 1.09, and a hydroxyl number of 0.93. The much lower acid number is in part the result of the absence of the lower acid reactive diluent so that the entire acid value in additive oxidation is not directly attributable to vastly increased amounts of higher acids; however, the amount of free higher acids obtained in acid additive oxidation was higher and these were not involved as esters. The lower carbonyl number and hydroxyl number in a single phase coordinated liquid oxidation are considered to be very significant, however. A similar VPC analysis was run.

EXAMPLE 3

A mixture of 236 grams of hexadecane, 129.2 grams of propionic acid and 72.2 grams of acetic acid (25:15:10 vol. ratio) was oxidized with air at 114–119° C., 250 p.s.i.g. for 5 hours using 1 percent (weight) manganese stearate catalyst. The percentage of $C_2$ in the off-gas was 14.5 percent. The oxidate weighed 442.5 grams. The oxidate was subjected to a flash operation wherein 210.6 grams of acetic and propionic acids were removed leaving 229.4 grams of heavier acid materials. The acid materials were washed with water after which 218.4 grams remained. This was then saponified with alcoholic KOH (2 N) yielding 160.4 grams of soaps. These soaps were washed with pentane to remove residual hydrocarbons and then distilled with concurrent addition of water to remove the methyl alcohol used in saponification, accomplishing hydrolysis of any methyl esters that might exist. The soaps were treated with 157.4 grams of 2 N $H_2SO_4$ and 128.3 grams of water to spring the acids. Acids sprung were then washed with water to yield 29.6 grams of "crude acids." VPC recovery of the crude acids was 62 percent, miscellaneous 13.5 for an excellent total VPC recovery of 75.5, indicating only small quantities of heavy esters. Wet chemical analyses of the crude acids showed an Acid Number (conventional measurement) of 258, Ester Value of 26.0, carbonyl value 0.43. The crude acids contained 0.86 percent $C_5$ acid, 3.67 percent $C_6$ acid; 5.83 percent $C_7$ acid; 7.27 percent $C_8$ acid; 8.19 percent $C_9$ acid; 9.58 percent $C_{10}$ acid; 9.30 percent $C_{11}$ acid; 7.38 percent $C_{12}$ acid; 5.66 percent $C_{13}$ acid; 2.60 percent $C_{14}$ acid; 0.36 percent $C_{15}$ acid; and 1.26 percent $C_{16}$ acid. The $C_{11}$–$C_{16}$ acids were 26.56 percent of the total acids.

The crude acids were then hydrogenated at 210° C. and 400 p.s.i.g. for 2 hours using a nickel-clay catalyst. The VPC recovery of the hydrogenated acids was an excellent 95 percent.

EXAMPLES 4–14

Example 3 was repeated as to general technique. Results are listed only partially for comparative purposes. These runs were selected to show certain effects particularly VPC recovery and other quality criteria as a function of different variables. Overall oxidations were sought to be made equal by operation at a constant air flow rate for the same duration (300 minutes) with a constant oxygen content of the off-gas of 14–17 percent. In general, the total oxygen up-take was held uniform at 14–15 grams oxygen pick-up to produce a conversion of 8–12 percent of hydrocarbon charged. Temperature was adjusted to maintain the desired rate of oxygen flow and hence a direct indication of oxygen take-up rate was obtained. The lower temperatures are preferable. Some runs were made using recycle unsaponifiable material from previous runs. This contained approximately 95 percent $C_{16}$ alkane, 3 percent $C_{16}$ ketone and 2 percent $C_{16}$ secondary alcohol with no lactone or ester content.

Catalyst and initiation were noteworthy details. At atmospheric pressure and without the acetic-propionic acids system, an induction period was necessary in which the material was heated to 140° C. for approximately 5 minutes before the temperature could be lowered without extinction of the oxidation. In the reactive diluent system with fresh paraffin feed with either type catalyst represented by tertiary butyl hydroperoxide or manganese stearate or with no catalyst using recycle material in which the very components apparently act as catalysts, there is no need for an induction period involving "superheating" so that the oxidate never has a high temperature history.

EXAMPLE 4

A mixture of the recycle $C_{16}$ material and acetic acid were mixed in a 1:1 proportion by volume and oxidized as before at 250 p.s.i.g. This was a two phase system at all times. The system would not begin oxygen take-up until a temperature of 134° C. was reached. Oxygen uptake rate at this temperature was low, and the temperature could not be reduced without extinguishing the oxidation.

EXAMPLE 5

Example 3 was repeated using the recycle $C_{16}$ material and propionic acid at atmospheric pressure in 1:1 volume ratio. A single phase system existed, however, a temperature of 145° was required for sustaining oxidation. This was a comparative run to correlate the systems of Examples 1 and 2 and was very good by prior art standards as well in comparison to the "acetic acid only" diluent system of Example 4. It was inferior to other experiments using a reactive diluent system with pressure operation.

EXAMPLE 6

Example 3 was repeated using hexadecane at atmospheric pressure without acid additive to develop a comparative feel on oxidation temperature. Tertiary butyl hydroperoxide catalyst was used. A temperature of 142° C. was required to sustain oxidation.

EXAMPLE 7

Example 3 was virtually duplicated as to conditions of oxidation except acetic anhydride was substituted for the acetic acid. The volume proportions were 300:167:33. Results were similar with the crude acids showing an acid recovery of 60.2 percent, miscellaneous 19.27 for an excellent total of 79.43. The wet chemical analysis showed an acid number of 257, ester value of 45.4, carbonyl value 0.56, hydroxyl value 2.39.

EXAMPLE 8

The basic technique of Example 3 was followed using hexadecane, propionic acid and acetic acid in 25:15:10 volume relationship at 250 p.s.i.g. using 1 percent manganese carboxylate catalyst. (Oxidation temperature was 120° C.) VPC recovery of the crude acids was 63.5 percent acids, 12.5 percent miscellaneous for an excellent 76 percent total.

EXAMPLE 9

Similar to Example 8 but using the recycle $C_{16}$ material without catalyst at 100 p.s.i.g. The oxidation temperature was 120° C. VPC recovery of the crude acids was 57 percent acids, 16 percent miscellaneous for a total or 73 percent.

EXAMPLE 10

Similar to Example 9 except at 250 p.s.i.g. The temperature was 117° C. VPC recovery of the crude acids was 55 percent acids, 19 percent miscellaneous for a total of 74 perecnt.

EXAMPLE 11

Example 3 was repeated using 1 percent tertiary butyl hydroperoxide catalyst instead of manganese stearate. VPC recovery of the crude acids was 59.4 percent acid, miscellaneous 8.5 for a total recovery of 67.9 percent. Acid number of the crude acids was 247, ester value 32.3, carbonyl value 1.08.

EXAMPLE 12

The technique of Example 3 was followed with octadecane, propionic acid and acetic acid in 25:15:10 ratio at 250 p.s.i., and 117° C. using 1 percent tertiary butyl hydroxyperoxide catalyst. Wet analysis of the crude acids showed acid number 216, ester value 48.1, carbonyl 1.29, hydroxyl 1.07, iodine number 14.9.

EXAMPLE 13

To compare hydrogenation performed on diluent-free oxidate and on crude acids, the oxidation of Example 12 was repeated using 1 percent manganese stearate catalyst at 117° C. A crude oxidate sample was analyzed and contained 11.6 percent acids after flash and water wash removal of lower acids. The VPC recovery of the crude acids derived from this crude oxidate by processing to crude acids as in Example 3 contained 60 percent acids, 15 percent miscellaneous, for an excellent total recovery of 75 percent. Of the 60 percent VPC acids in the crude acids, 54.7 percent fell in the $C_{11}$–$C_{16}$ range. The wet analysis was acid number 227, ester value 24.0, and carbonyl value 0.60. Another sample of the crude oxidate after the flash and water wash processing only was then mildly hydrogenated (210° C., 400 p.s.i., 2 hours, nickel-clay catalyst). The product was then processed through saponification, pentane wash, distillation with water and treatment with $H_2SO_2$ as in Example 3 to yield acids having VPC analysis of 93 percent acids in which 62 percent were in the $C_{11}$–$C_{16}$ range. This marked a 14 percent increase in the $C_{11}$–$C_{16}$ acids.

EXAMPLE 14

Example 13 was repeated using octadecane and propionic acid in 1:1 volume ratio at 250 p.s.i.g. with 1 percent tertiary butyl hydroperoxide catalyst. A temperature of 140° was required to sustain oxidation; however, a high acids content of 26.5 percent was noted in the oxidate after flash and water wash removal of the lower acids. VPC recoveries of crude acids showed 47.69 percent acids, 3.29 miscellaneous for a total of 50.98. Acid value was somewhat low at 218, ester value was 56.5, carbonyl 1.31, hydroxyl 1.67.

EXAMPLE 15

Example 13 was repeated with cyclohexane, propionic acid and acetic acid in 25:15:10 volume ratio, 250 p.s.i.g. and 1 percent manganese stearate catalyst. Oxidation for the standard take-up rate, duration and off-gas content used in previous runs was followed with no adjustment for different size of feed molecules or the production of dibasic acids rather than monobasic acids. Oxidate was analyzed in several ways to confirm the production of adipic acid. VPC analysis after esterification with diazo methane showed adipic acid, cyclohexanol and cyclohexanone present in the ratios 100:10:5 for a surprising ratio of 7:1 of adipic acid to intermediates. Several minor peaks were noted on the VPC analysis. In another analysis technique, raw oxidate was flashed under vacuum to yield a residue amounting to 1.8 percent (wt.) of the total which was analyzed by infrared spectroscopy. This material produced a spectrum which resembled the reference spectrum for adipic acid more closely than did a sample of CP grade adipic acid similarly analyzed. Actually the VPC presentation of the adipic acid peak corresponded to CP grade adipic as to location and retention time and was extremely distinct and sharp sided indicative to those skilled in such matters of a material of extremely high purity. The 1.8 percent production is considered excellent in view of the fact that on the basis of oxidizable hydrocarbon fed it is actually 3.6 percent. When approximately 0.5 production of cyclohexanol and cyclohexanone is added to this, it is seen that this conversion is close to the conversion to cyclohexanol usually sought in the air oxidation first stage of the two stage prior art processes. An important point is that there was no crystallization of adipic in the oxidizer or the oxidate even after it has cooled to room temperature. Thus there is no problem from this source comparable to that encountered in conventional adipic acid first oxidation stages where adipic acid inadvertently formed crystallizes out requiring the use of large quantities of water in such oxidizers with attendant adverse effect and numerous problems.

The cyclohexane-adipic acid run including its analysis provides a graphic illustration of the commercial significance of the present invention. Conventional adipic acid plants generally require plural oxidation stages, the first with air in which the production of cyclohexanol is sought, the latter a nitric acid oxidation of the cyclohexanol with extremely complex intervening separation, frequently involving acids such as boric to deliberately produce esters. The present process per se requires mainly two simple vessels and a condenser. The first vessel is an oxidizer, the second a flash distillation chamber. Oxidate flashes in the chamber at a temperature just above the melting point of adipic acid so that all other materials, acetic acid, propionic acid, cyclohexane, cyclohexanol, cyclohexanone are vaporized to be condensed and returned to the oxidizer. Adipic acid is thus obtained as a liquid without any solvent or diluent. Separation of the adipic acid from other components of oxidate is thus so easy that there is little need for going to high concentrations of acid in oxidate and risking the higher probability of multiple attack that ensues. As a practical matter, concentrations of 4 percent, 2 percent or lower are very practical and any limiting cost as to low conversion is merely that of operation of the distillation and of pumping. Another important point is that the flash vapor is extremely pure so that cyclohexanol and cyclohexanone are readily fractionated from the vapors if it is desired to obtain them for separate sale. The remaining vapors are the lower acids of the system, water and cyclohexane. Provision for removal of the water is desired. By-product $CO_2$ is also available.

EXAMPLE 16

A sample of tetradecene-1 was oxidized in a system having a ratio of 300 ml. of olefin to 120 ml. of propionic acid to 80 ml. of acetic acid using 1 percent by volume of manganese acetate catalyst at 250 p.s.i.g. operating pressure. Temperature of operation was 97° C. for substantially the same rate of oxygen take-up as with similar saturated hydrocarbon experiments at 115 to 120° C. Product work-up was substantially the same as in preceding Example 3 to yield crude acids whose VPC acid recovery was 34.77, miscellaneous recovery 8.10 for a total VPC recovery of 47.87 percent. The wet chemical analysis of the crude acids gave an acid number of 145, an ester value of 21.4, carbonyl percent 0.13, hydroxyl weight percent 1.30, iodine number 18.0.

An important result of this oxidation was a high percentage yield of the higher acids undecanoic, dodecanoic and tridecanoic which together made up 86 percent of the crude acid recovered. Of these acids the peak product acid was tridecanoic acid indicating results approaching that of the much more complicated ozonolysis operation, a high percentage of the cleavage being at the site of the double bond.

EXAMPLES 17–22

A series of closely coordinated runs was made to study the effect of variations in the concentration of reactive diluent acids of a 1.5:1 propionic:acetic system. Oxidation was at 250 p.s.i.g. using 1 percent manganese acetate catalyst and octadecane as the hydrocarbon material. The temperature of operation was 115–120° C. where possible, higher up to about 140° C. in Example 22, as in previous examples with operation primarily based on the standardized oxygen uptake rate. Crude acids were recovered as in Example 3. Results as to saponification number, carbonyl number, and VPC recoveries of crude acids are tabulated as follows:

| Example No. | Volume, percent acid diluent | Sap. No. | C=O | VPC recovery | | |
|---|---|---|---|---|---|---|
| | | | | Acids | Misc. | Total |
| 17 | 50 | 259 | 0.13 | 69.6 | 6.5 | 76.1 |
| 18 | 40 | 274 | 0.12 | 72.2 | 4.5 | 76.7 |
| 19 | 30 | 245 | 0.32 | 65.9 | 4.2 | 70.1 |
| 20 | 20 | 264 | 0.33 | 70.0 | 7.7 | 77.7 |
| 21 | 10 | 224 | 0.47 | 47.8 | 4.8 | 52.6 |
| 22 | 0 | 265 | 0.70 | 56.4 | 8.2 | 64.6 |

Figure 3:
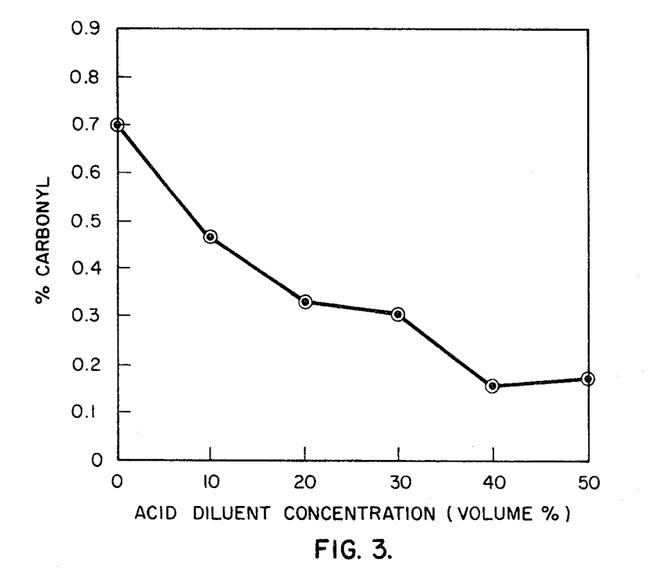
FIG. 3 shows a plot of percent carbonyl in oxidate versus reactive diluent concentration to show the effect of reactive diluent. The data is on a basis of oxidate after removal of the reactive diluent acids.
Figure 4:
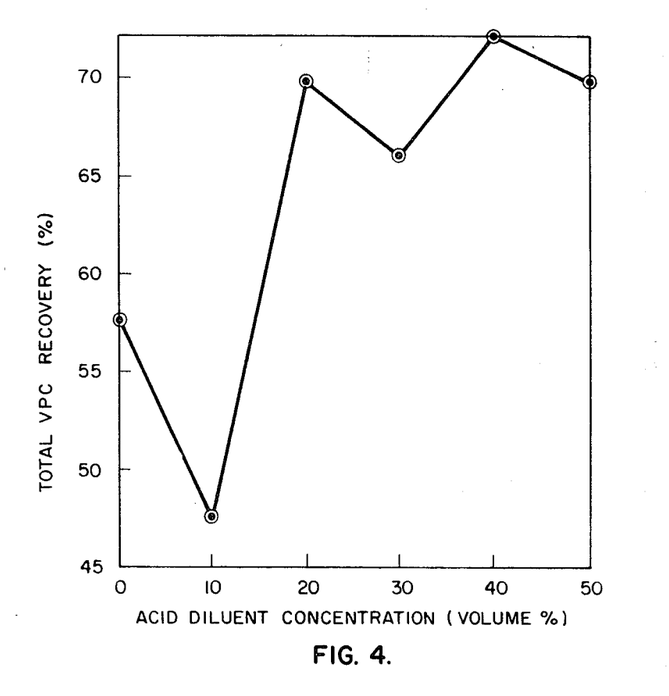
FIG. 4 shows a plot of percentage recovery in VPC analysis of an oxidate for oxidates produced with different percentage of reactive diluent. Heavy esters generally are retained during the VPC operation hence a correlation is made between high values of VPC recovery and reduced quantities of heavy residue.

The foregoing data forms the basis for FIGS. 3 and 4 which are considered to be self explanatory.

From the results of this study, a basis for a preference as to the quantity of acid diluent based on the 1.5 to 1 volume ratio of propionic acid to acetic acid is shown as approximately 40 percent diluent acids in the total acid-hydrocarbon oxidation system. In comparison with certain other experiments reported herein, one may note a trend observed in numerous other unreported comparative experiments which showed a superiority of manganese acetate catalyst over manganese stearate.

EXAMPLE 23

This example was virtually a duplicate of Example 22 without diluent acids but with operation at atmospheric pressure. Comparative results based on crude acids obtained by processing as in Example 3 are as follows: saponification number 224, carbonyl number 0.86, VPC recovery of acids 41.8, VPC recovery miscellaneous 12.5 for a total VPC recovery of 54.3. In this run, as in previous runs, temperature was adjusted to maintain the reference oxygen uptake rate. This corresponded to a temperature of approximately 140° C.

EXAMPLE 24

Heptadecane was oxidized in proportions of 250 ml. thereof to 150 ml. of propionic acid to 100 ml. of acetic acid at 250 p.s.i.g. at a temperature of 115–120° C. to maintain the usual standard oxygen uptake rate. Catalyst used was 1% by volume of manganese stearate. Results were similar to those of foregoing similar experiments with other members of that homologous series of feed hydrocarbon materials providing the following VPC results on analysis of the crude acids obtained by processing as in Example 3: VPC acids recovery 61.1, VPC miscellaneous recovery 9.4, total VPC recovery 70.0.

EXAMPLE 25

A run similar to Example 24 was made wherein the acetic acid was omitted and replaced by additional (equal) volume of propionic acid providing an oxidation mixture 50% heptadecane and 50% propionic acid by volume. The results were substantially similar to those of Example 1 with hexadecane; however, this was a 250 p.s.i.g. run. VPC recovery of the crude acids obtained by processing as in Example 3 was: 51.7 percent acids, 7.6 percent miscellaneous for a total recovery of 59.3 percent.

EXAMPLE 26

An oxidation run was made similar to Example 24 using decane as the hydrocarbon material oxidized in place of the heptadecane of Example 24. Results adjudged similar to those of Example 24 were obtained, the VPC analysis of crude acids obtained by processing as in Example 3 being 67.3 percent acids, 3.9 percent miscellaneous for a total recovery of 71.2 percent.

EXAMPLE 27

Example 25 was repeated using eicosane as the hydrocarbon material oxidized in a 50—50 volume ratio with the propionic acid only, no acetic acid being used. Results adjudged similar to those of Example 25 were obtained, the VPC recovery of crude acids obtained by processing as in Example 3 being 54.3 percent acids, 2.6 percent miscellaneous for a total VPC recovery of 56.9 percent.

EXAMPLE 28

Heptadecane was oxidized as in previous Examples 24 and 25; however, the important difference here was that propionic acid was omitted and 5 percent acetic acid was used as the sole material of a "reactive diluent" nature. Reaction was at 250 p.s.i.g. and the temperature adjusted to maintain the standard oxygen uptake rate operation requiring approximately 140° C. Crude acids were obtained by processing as in Example 3 and analyzed by VPC giving an acid recovery of 48.1 and a miscellaneous recovery of 18.4 for a total VPC recovery of 59.4. It is significant to observe in comparing Example 28 with Examples 25 and 24 that the total VPC recoveries were approximately the same for 25 and 28 but that the "miscellaneous" recovery amount of the propionic acid system was approximately half that of the "acetic acid only" system. Example 24 shows the considerable improvement in the acid recovery of crude acids where the acetic-propionic system is used in comparison to that where only the acetic system is used in low percentage. Other chemical analyses that reflect the difference previously shown between "acetic only" and "propionic only" systems are not reported; however, they do not show any particularly different results from previous experiments.

EXAMPLE 29

The miscibility of heptadecane and acetic acid was studied in glassware in a 50—50 (volume) mixture. Two separate phases existed, there being no visually evident miscibility.

EXAMPLE 30

Example 29 was repeated with a system of 95 percent heptadecane and 5 percent by weight of acetic acid. Again there were two separate phases with no visually evident miscibility.

EXAMPLE 31

Examples 29 and 30 were repeated using a mixture of 250 ml. of heptadecane, 150 ml. of propionic acid, and 100 ml. of acetic acid. The resulting mixture was a single phase system with no evidence of layering. It is believed evident from Example 31 that if propionic acid is capable of solubilizing heptadecane and acetic acid that a similar system of approximately 50 percent heptadecane and 50 percent propionic acid is also single phase.

The significance of the Examples 29, 30 and 31 is that a showing is made that all lower acids are not equivalent as regards their ability to provide a single phase system with oil phase materials such as heptadecane and that acetic acid forms a separate phase from the oil phase heptadecane even in 5 percent by weight proportions.

EXAMPLE 32

Foregoing examples are repeated using various hydrocarbon materials. Particular emphasis is placed on materials with compatible combinations of characteristics of the following: saturated, unsaturated, cyclic, acyclic, materials of from about 6 to about 30 carbon atoms per molecule. Included are materials of intermediate nature with or without oxygen present in the molecule, typically corresponding hydroperoxides, olefins, secondary alcohols, ketones and aldehydes and similar materials with dual such functionality of similar or different type and combination products. Typical of such materials are hydroxy acids, esters of secondary alcohols, acid-esters of hydroxy acids, and lactones. Included are materials of branched carbon skeletal structure (tertiary carbons) as well as materials of exclusively straight chain carbon skeletal structures (primary or secondary carbons). Included are mixtures of various of the foregoing materials.

Reactive diluent acid systems used include propionic only systems and systems containing at least one lower monobasic carboxylic acid having from 3 to 5 carbon atoms per molecule and at least one lower monobasic carboxylic acid having less than three carbon atoms per molecule. Ratios of the 3 to 5 carbon atom acids used relative to the less than 3 carbon atom acids are preferably about 1:1 on a mol basis ranging from about 5:1 in one sense to about 5:1 in the other; a narrower more preferred range being from about 2:1 in one direction to about 2:1 in the other.

Ratios of hydrocarbon materials to reactive diluent materials are preferably about 4 parts by volume of hydrocarbon diluent materials, to 6 parts by volume of hydrocarbon materials but may range from about 20 percent to about 80 percent by volume of reactive diluent materials with a narrower range of about 20 percent to about 50 percent by volume of reactive diluent materials being preferable.

Preferred temperatures are slightly above the extinction on threshold temperature which varies according to the materials used. To a limited extent temperature is adjusted to influence the point of oxygen attack in complex molecules. Open chain saturated molecules experience statistical attack at secondary and primary carbon atoms at a threshold under the most highly preferred combinations of reactive diluent materials and proportions at a sustaining temperature of about 115–120° C. Cyclic materials experience sustaining oxidation at temperatures of about 105–110° C. Branching (tertiary carbon atoms) and unsaturation contribute slight selectivity at the point or points of such characteristic permitting slightly lower sustaining temperatures such as 97° C. for tetradecene-1. The presence of intermediate oxygenated materials such as hydroperoxides, ketones, secondary alcohols, esters, lactones and aldehydes contributes to lower sustaining oxidation temperature than in the absence of such; however, these materials are usually produced in situ in any sustaining system and hence do not alter the previous sustaining temperature. On the other hand, the absence of such intermediates as for example with a fresh charge of pure hexadecane or octadecane even in a reactive diluent system, requires higher initiation temperatures, typically several minutes at 140° C. preceding the sustaining operation.

Oxidants used are of various forms including molecular oxygen in pure form and together with various percentages of diluents such as nitrogen, carbon dioxide and combinations of diluents. Another form is a chemical material capable of releasing oxygen in situ. Air is a typical oxidant which in some experments is materially starved of oxygen, in others is enriched in oxygen and in others is a combination involving the further presence of significant carbon dioxide.

A preferred pressure of operation is about 250 p.s.i.g., variable to some extent as dictated mainly by vapor pressure properties of the materials at the sustaining temperatures rather than for influence upon any criticality as to the fundamental reactions. Pressures range from 5 to 25 atmospheres, a narrower range of 10 to 20 atmospheres being preferable.

Catalysts used are heavy metal carboxylate, particulate manganese materials such as stearate or acetate with preference for acetates or acetate-propionate mixture initially added or inherently produced in situ corresponding approximately to the molecular weight distribution of the acidic components in the systems undergoing oxidation. Catalyst percentages are not critical, typically about 1 percent by volume based on the hydrocarbon material being oxidized (exclusive of the reactive-diluent content).

Products of the foregoing include monobasic and dibasic carboxylic acids of high purity as regards at least one of the aspects of low carbonyl content, low hydroxyl content, low ester value, low lactone content and ease of purification. The preferred combinations of materials, proportions and conditions exhibit high purity as regards

I claim:

1. In a process for the preparation of carboxylic acids by the oxidation of hydrocarbon materials with molecular oxygen, the improvement wherein the oxidation is conducted in the presence of a reactive diluent system providing a coordinated single phase liquid, said system containing acetic acid and at least one lower monobasic carboxylic acid having from three to about five carbon atoms per molecule, said acids being in proportions such that the molar ratio of acetic acid to the latter acid is from about 5:1 to about 1:5, the volume ratio of hydrocarbon materials to the acids being from about 4:1 to about 1:4.

2. The process of claim 1 wherein the volume ratio of hydrocarbon materials to the acids is from about 4:1 to about 1:1.

3. In a process for the preparation of carboxylic acids by the oxidation of hydrocarbon materials with molecular oxygen, the improvement wherein the oxidation is conducted in the presence of a reactive diluent system providing a coordinated single phase liquid containing acetic acid and propionic acid, said acids being in a volume ratio of about 1.5 of acetic acid to 1 of propionic acid and constituting about 50 percent of the liquid volume of the system.

4. The process of claim 1 wherein the molar ratio of acetic acid to said monobasic carboxylic acid is from about 2:1 to about 1:2.

5. A process in accordance with claim 1 wherein the hydrocarbon material of the system consists essentially of at least one normal hydrocarbon having from about 10 to about 20 carbon atoms per molecule together with species thereof containing oxygen functionality.

6. The process of claim 1 wherein said monobasic carboxylic acid is propionic acid.

7. The process of claim 1 wherein said monobasic carboxylic acid is propionic acid and the molar ratio of acetic acid to propionic acid is from about 2:1 to about 1:2.

8. The process of claim 1 wherein said monobasic carboxylic acid is propionic acid and the volume ratio of hydrocarbon materials to the acids is from about 4:1 to about 1:1.

9. The process of claim 1 wherein a manganese oxidation catalyst is employed.

10. The process including the improvement of claim 1 further characterized in that it is performed at a temperature near the minimum oxidation sustaining temperature for the material oxidized.

11. A process in accordance with claim 10 further characterized in that the temperature is about 115 to about 120° C. for normal saturated hydrocarbon material, about 105 to about 110° C. for cyclic hydrocarbon material and about 97° C. for unsaturated hydrocarbon material.

12. The process including the improvement of claim 1 further characterized in that the hydrocarbon material oxidized is selected from the group consisting of saturated and unsaturated, acyclic and cyclic, unbranched and branched carbon skeleton hydrocarbons having from about 6 to about 30 carbon atoms per molecule, species of the foregoing containing oxygen functionality, and mixtures of the foregoing.

13. A process in accordance with claim 1 wherein the hydrocarbon material of the system consists essentially of at least one normal hydrocarbon having from about 6 to about 30 carbon atoms per molecule together with species thereof containing oxygen functionality to provide straight chain saturated monobasic carboxylic acids.

14. A process in accordance with claim 1 wherein the hydrocarbon material of the system consists essentially of at least one unbranched saturated cyclic hydrocarbon having from about 6 to about 12 carbon atoms per molecule together with species thereof containing oxygen functionality to provide dibasic acid corresponding in number of carbon atoms per molecule to the number of carbon atoms per molecule of said hydrocarbon material.

15. A process in accordance with claim 1 wherein the hydrocarbon material is predominantly at least one monoolefin having from about 6 to about 30 carbon atoms per molecule together with species thereof containing oxygen functionality to provide straight chain saturated monobasic carboxylic acids.

References Cited

UNITED STATES PATENTS

| | | | |
|---|---|---|---|
| 3,076,842 | 2/1963 | Jason et al. | 260—533 |
| 3,087,963 | 4/1963 | Wiese et al. | 260—526 |
| 3,231,608 | 1/1966 | Kollar | 260—533 |
| 3,238,250 | 3/1966 | Bailey | 260—514 |

LEWIS GOTTS, Primary Examiner

E. G. LOVE, Assistant Examiner

U.S. Cl. X.R.

260—533, 537